(12) United States Patent
Wicken et al.

(10) Patent No.: US 11,058,963 B2
(45) Date of Patent: *Jul. 13, 2021

(54) MODULAR BALLOON SUPPORT

(71) Applicant: Balloon Innovations, Inc., Westminster, CO (US)

(72) Inventors: Christopher J. Wicken, Golden, CO (US); Gregg A Wicken, Boulder, CO (US)

(73) Assignee: BALLOON INNOVATIONS INC., Westminster, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/319,484

(22) PCT Filed: Jun. 18, 2015

(86) PCT No.: PCT/US2015/036527
§ 371 (c)(1),
(2) Date: Dec. 16, 2016

(87) PCT Pub. No.: WO2015/195981
PCT Pub. Date: Dec. 23, 2015

(65) Prior Publication Data
US 2017/0128850 A1    May 11, 2017

Related U.S. Application Data

(60) Provisional application No. 62/013,973, filed on Jun. 18, 2014.

(51) Int. Cl.
*A63H 27/10*    (2006.01)
*G09F 21/06*    (2006.01)
(Continued)

(52) U.S. Cl.
CPC .............. *A63H 27/10* (2013.01); *A47F 10/00* (2013.01); *F16B 9/02* (2013.01); *F16M 11/08* (2013.01);
(Continued)

(58) Field of Classification Search
CPC ............ A63H 27/10; A63H 2027/1008; A63H 2027/1041; A63H 2027/1091
See application file for complete search history.

(56) References Cited

U.S. PATENT DOCUMENTS 1,262,517 A    8/1882    Unz
1,527,046 A    10/1922   Ingram
(Continued)

FOREIGN PATENT DOCUMENTS

KR          617502 B1 *    9/2006
WO     2015195981 A1      12/2015

OTHER PUBLICATIONS

U.S. Appl. No. 14/742,855, filed Jun. 18, 2015, First Inventor: Christopher J. Wicken.
(Continued)

*Primary Examiner* — Eugene L Kim
*Assistant Examiner* — Alyssa M Hylinski
(74) *Attorney, Agent, or Firm* — Berg Hill Greenleaf Ruscitti LLP

(57) ABSTRACT

The general inventive technology in this application includes methods and apparatus for producing a modular balloon cluster. Such modular balloon clusters may include a plurality of helium-free balloons coupled with a central modular adaptor forming a cluster. In certain cases, multiple modular adaptors may be positioned on a display pole and may even be positioned in an offset manner forming a continuous spiral balloon cluster display.

134 Claims, 11 Drawing Sheets

(51) Int. Cl.
*A47F 10/00* (2006.01)
*F16B 9/02* (2006.01)
*F16M 11/08* (2006.01)

(52) U.S. Cl.
CPC ...... *G09F 21/06* (2013.01); *A63H 2027/1008* (2013.01); *A63H 2027/1041* (2013.01)

(56) References Cited

U.S. PATENT DOCUMENTS

| | | | |
|---|---|---|---|
| 1,512,831 A | | 10/1924 | Dunnell |
| 1,535,396 A | | 4/1925 | Buehler |
| 1,648,338 A | | 11/1927 | Gains |
| 1,677,379 A | | 7/1928 | Ames |
| 1,782,070 A | | 11/1930 | Lazarus |
| 1,788,157 A | | 1/1931 | Hogan |
| 2,143,691 A | | 4/1938 | Goldberg et al. |
| 2,209,875 A | | 7/1940 | Eichelsdoerfer |
| 2,488,396 A | | 11/1949 | Gottholm |
| 2,664,667 A | | 1/1954 | Burroughs |
| 2,840,948 A | | 7/1958 | Stickley |
| 2,922,252 A | | 1/1960 | Van Dam Albert |
| 2,924,041 A | | 2/1960 | Jackson |
| 3,150,460 A | | 9/1964 | Dees |
| 3,162,409 A | | 12/1964 | Straayer |
| 3,192,568 A | | 7/1965 | Nicholls |
| 3,366,999 A | | 2/1968 | Darby |
| 3,439,079 A | | 4/1969 | McDowell |
| 3,892,081 A | | 11/1975 | Goral |
| 3,920,207 A | | 11/1975 | Adamaitis |
| 4,035,462 A | | 7/1977 | Lane, Jr. |
| 4,542,445 A | | 9/1985 | Marletta |
| 4,589,854 A | | 5/1986 | Smith |
| 4,712,510 A | | 12/1987 | Tae-Ho |
| 4,794,498 A | | 12/1988 | Neumeier |
| 4,881,916 A | * | 11/1989 | Houser ............. A63H 27/10 446/222 |
| 4,895,545 A | | 1/1990 | Nelson et al. |
| 4,934,986 A | * | 6/1990 | Wallace ............. A63H 27/10 446/220 |
| 4,953,713 A | | 9/1990 | Yaffe |
| 5,027,992 A | | 7/1991 | Murray |
| 5,036,985 A | | 8/1991 | Lovik |
| 5,052,733 A | | 10/1991 | Cheung et al. |
| 5,127,867 A | * | 7/1992 | Lau ............. G09F 19/00 446/221 |
| 5,188,332 A | | 2/1993 | Callas |
| 5,203,530 A | | 4/1993 | Liu |
| 5,234,726 A | | 8/1993 | Dahan |
| 5,282,768 A | * | 2/1994 | Akman ............. A63H 27/10 446/220 |
| 5,564,575 A | | 10/1996 | Casement |
| 5,575,470 A | | 11/1996 | Sherman |
| 5,746,461 A | | 5/1998 | Broberg |
| 5,769,474 A | | 6/1998 | Moore |
| 5,823,365 A | | 10/1998 | Page |
| 5,873,764 A | | 2/1999 | Scherr |
| 5,938,255 A | | 8/1999 | Rose et al. |
| 5,944,576 A | | 8/1999 | Nelson et al. |
| 6,176,758 B1 | | 1/2001 | Wu |
| 6,273,479 B1 | | 8/2001 | Carlson |
| 6,422,914 B1 | | 7/2002 | Nelson |
| 6,478,057 B1 | | 11/2002 | Bearss et al. |
| 6,478,651 B1 | | 11/2002 | Weir |
| 6,745,904 B1 | | 6/2004 | Komar |
| 6,923,141 B1 | | 8/2005 | Staats |
| 6,935,268 B1 | | 8/2005 | Hawkins |
| 6,938,871 B1 | | 9/2005 | Carlson |
| 6,969,295 B1 | | 11/2005 | Sidwell |
| D517,123 S | | 3/2006 | Sidwell |
| 7,017,511 B2 | | 3/2006 | Fisher |
| 7,249,991 B1 | | 7/2007 | Watson |
| 7,588,477 B2 | | 9/2009 | Sidwell |
| 7,611,395 B2 | | 11/2009 | Bonsembiante |
| D610,208 S | | 2/2010 | Hou |
| 7,810,265 B2 | | 10/2010 | Beatty |
| 7,854,642 B2 | | 12/2010 | Nelson et al. |
| 7,922,116 B2 | | 4/2011 | Nguyen |
| 7,967,344 B2 | | 6/2011 | Herren |
| 8,152,588 B2 | | 4/2012 | Hua |
| D659,200 S | | 5/2012 | Wicken |
| 8,544,407 B2 | | 10/2013 | Spray |
| 8,789,565 B1 | | 7/2014 | Wicken |
| 8,840,440 B2 | | 9/2014 | Pierce |
| 8,968,047 B1 | * | 3/2015 | Wicken ............. F16M 11/22 446/220 |
| 9,087,462 B1 | | 7/2015 | Gallus |
| 9,132,595 B1 | | 9/2015 | Wicken et al. |
| 9,192,870 B2 | * | 11/2015 | Chapman-Rickman ............. A63H 27/10 |
| 9,679,504 B1 | * | 6/2017 | Wicken ............. A47F 10/00 |
| 9,809,784 B2 | | 11/2017 | Wang et al. |
| 2001/0045074 A1 | | 11/2001 | Kim |
| 2003/0071185 A1 | | 4/2003 | Casapulla |
| 2004/0077268 A1 | | 4/2004 | Wainhou |
| 2006/0011793 A1 | | 1/2006 | Dupuis et al. |
| 2006/0246816 A1 | * | 11/2006 | Sidwell ............. A63H 27/10 446/220 |
| 2006/0289707 A1 | * | 12/2006 | Greenwald ............. A63H 27/10 248/127 |
| 2006/0292960 A1 | | 12/2006 | Muller |
| 2007/0007424 A1 | | 1/2007 | Sifferlin et al. |
| 2007/0049158 A1 | | 3/2007 | Chou |
| 2007/0218802 A1 | | 9/2007 | Gronethal |
| 2008/0121309 A1 | | 5/2008 | Boise et al. |
| 2008/0166942 A1 | * | 7/2008 | Hou ............. A63H 27/10 446/86 |
| 2008/0166943 A1 | * | 7/2008 | Hou ............. A63H 27/10 446/86 |
| 2009/0197502 A1 | | 8/2009 | Nelson et al. |
| 2009/0296372 A1 | | 12/2009 | Schrimmer |
| 2011/0240823 A1 | | 10/2011 | Hua |
| 2011/0253876 A1 | | 10/2011 | Odell |
| 2011/0290171 A1 | | 12/2011 | Brick |
| 2012/0015581 A1 | | 1/2012 | Feldstein |
| 2012/0211614 A1 | | 8/2012 | Parello et al. |
| 2014/0096867 A1 | * | 4/2014 | Cayton ............. F21S 10/02 141/98 |
| 2015/0165335 A1 | * | 6/2015 | Hsiao ............. A63H 27/10 446/223 |
| 2016/0189578 A1 | | 6/2016 | Wicken |
| 2016/0214023 A1 | | 7/2016 | Wicken |
| 2016/0220917 A1 | | 8/2016 | Wicken |
| 2017/0144077 A1 | * | 5/2017 | Wicken ............. A63H 27/10 |

OTHER PUBLICATIONS

U.S. Appl. No. 14/840,612, filed Jun. 16, 2015, First Inventor: Christopher J. Wicken.
U.S. Appl. No. 14/635,898, filed May 30, 2015, First Inventor: Christopher J. Wicken.
U.S. Appl. No. 14/201,665, filed Mar. 7, 2014, First Inventor: Christopher J. Wicken.
U.S. Appl. No. 61/774,344, filed Mar. 7, 2013, First Inventor: Christopher J. Wicken.
U.S. Appl. No. 14/743,839, filed Jun. 18, 2015, First Inventor: Christopher J. Wicken.
International Application No. PCT/US15/036527, filed Jul. 21, 2015 entitled "Modular Balloon Support". Search Report dated Sep. 30, 2015, 4 pages.
International Application No. PCT/US15/036527, filed Jul. 21, 2015 entitled "Modular Balloon Support", Written Opinion dated Sep. 30, 2015, 14 pages.
U.S. Appl. No. 14/740,612, filed Jun. 18, 2015, First Inventor: Christopher J. Wicken.
U.S. Appl. No. 14/931,631, filed Nov. 3, 2015, First Inventor: Christopher J. Wicken.
U.S. Appl. No. 15/076,182, filed Mar. 21, 2016, First Inventor: Christopher J. Wicken.
U.S. Appl. No. 14/946,246, filed Nov. 19, 2015, First Inventor: Christopher J. Wicken.

(56) References Cited

OTHER PUBLICATIONS

U.S. Appl. No. 14/831,759, filed Aug. 20, 2015, First Inventor: Christopher J. Wicken.
U.S. Appl. No. 62/039,737, filed Aug. 20, 2014, First Inventor: Christopher J. Wicken.
U.S. Appl. No. 14/853,224, filed Sep. 14, 2015, First Inventor: Christopher J. Wicken.
U.S. Appl. No. 62/013,973, filed Jun. 18, 2014, First Inventor: Christopher J. Wicken.
U.S. Appl. No. 15/178,434, filed Jun. 9, 2016. First Named Inventor: Christopher J. Wicken.
Balloons Everywhere, Everyday Catalog & Buyers Guide. Wholesale Balloons & Floral Accessories. © 2007, 2008 Balloons Are Everywhere, Inc. 10 pages.

* cited by examiner

MODULAR BALLOON SUPPORT

This application is the United States National Stage of International Application No. PCT/US2015/036527, filed Jun. 18, 2015, which claims the benefit of and priority to U.S. Provisional Application No. 62/013,973 filed Jun. 18, 2014. The above-mentioned applications are hereby incorporated in their entirety by reference.

TECHNICAL FIELD

The inventive technology generally relates to the field of marketing or other displays. Generally, the inventive technology disclosed herein relates to a novel and unique modular balloon cluster system. In a preferred embodiment, the invention may be used to couple, for example, a plurality of helium-free balloons and/or other marketing displays in a clustered arrangement that may then be positioned inside and/or outside commercial establishments to attract attention and/or highlight a specific promotion or event. More specifically, the inventive technology, in a preferred embodiment, described generally herein relates to an improved modular helium-free balloon cluster system. This inventive technology may be particularly suited for helium-free balloons and other marketing display systems that are positioned outside commercial establishments to attract attention and/or highlight a specific promotion or event. In certain embodiments, such assemblies may mimic the action and presentation of traditional helium balloons and the like.

BACKGROUND

Traditional external marketing assemblies are commonly employed to promote various commercial or organizational interests as well as events. For example, traditional external marketing devices may include some type of large object, such as signs, placards or novelty attention-grabbing devices that may be placed outside to catch a passerby's attention, thereby promoting a certain business or event. In recent years, various inflatable external marketing devices, such as balloons and the like have been deployed as marketing devices to attract public attention. Example of such air-filled based systems may include external balloon systems. Despite their use, such large inflatable devices have several drawbacks that limit their uses.

Simple helium filled balloons are typically small and have a limited period of use prior to becoming deflated. For example, traditional helium-filled balloons, whether used as novelties or displays, have been around for well over a century. Such traditional helium-filled balloons are generally made from latex or Mylar, however, these materials are limiting. For example, latex oxidizes quickly losing its elastic quality becoming brittle and deformed. In addition, latex poses a problem as it is a serious allergen for many people. Mylar, on the other hand quickly loses helium across its thin surface membrane limiting its ability to remain aloft for any significant amount of time. Additionally, such traditional helium balloons are difficult to form into organized clusters, which again, have a limited period of use. In addition, traditional helium-based large inflatable balloons and devices are not cost effective. A lack of private sector helium producers, federal regulations and decline in U.S. Federal Helium Reserves have resulted in significant price increases and dwindling supplies of commercially available helium. Much of the available helium gas is currently being diverted to industrial and/or medical uses, such as MRIs, cryogenic preservation as well as scientific applications such as particle accelerators. Under these conditions, it is simply not cost effective to continue production of helium-dependent inflatable marketing systems.

As a result, the use of helium-free balloons has been popularized. In certain embodiments helium-free balloons may be configured into various displays. However, such configurations require such systems to be engineered to not only be sufficiently stable to support the additional weight of such systems, but also to be cost effective as well as aesthetically pleasing. It should be noted that the foregoing problems regarding traditional modular balloon systems may represent a long-felt need for an effective solution to the same. While implementing elements may have been available, actual attempts to meet this need may have been lacking to some degree. This may have been due to a failure of those having ordinary skill in the art to fully appreciate or understand the nature of the problems and challenges involved. As a result of this lack of understanding, attempts to meet these long-felt needs may have failed to effectively solve one or more of the problems or challenges here identified. These attempts may even have led away from the technical directions taken by the present inventive technology and may even result in the achievements of the present inventive technology being considered to some degree an unexpected result of the approach taken by some in the field.

DISCLOSURE OF INVENTION(S)

In a preferred embodiment, the inventive technology may be configured to accomplish a number of objectives. For example, one objective of the inventive technology may be to provide an improved modular system for manufacturing modular balloon support systems. Another objective of the inventive technology may be to provide a balloon support system that may have modular components that are easily attachable and detachable so as to allow a user to quickly and easily set-up and break-down a balloon cluster display. Another objective of the inventive technology may be to provide a balloon support system that may be coupled with one or more components, such as rods or poles so as to be elevated or hung from a specific location. Another objective of the inventive technology may be to provide a balloon support system that may have modular components that are interchangeable and may include multiple alternative and/or redundant components and/or fastener or coupler positions. Another objective of the inventive technology may be to provide a display formed by the coupling of a plurality of modular balloon cluster assemblies to a display pole or other support apparatus. In one preferred embodiment, individual modular balloon cluster assemblies may be inserted, and coupled with a display pole in an offset manner producing a continuous spiral-like modular balloon cluster display.

MODE(S) FOR CARRYING OUT THE INVENTION(S)

The present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

As generally shown in the figures, the inventive technology may include numerous embodiments for a modular balloon cluster (1). Generally, in a preferred embodiment a modular balloon cluster (1) may include a one, or a plurality of balloons that may be grouped together to form a display. One such preferred embodiment may include seamed and/or seamless helium-free balloons, such as those described in U.S. patent application Ser. No. 14/201,665, (which is incorporated herein in its entirety.) In another preferred embodiment, a modular balloon cluster (1) may include a plurality of helium-free balloons coupled with a central adaptor forming a cluster formation for display.

Figure 1:
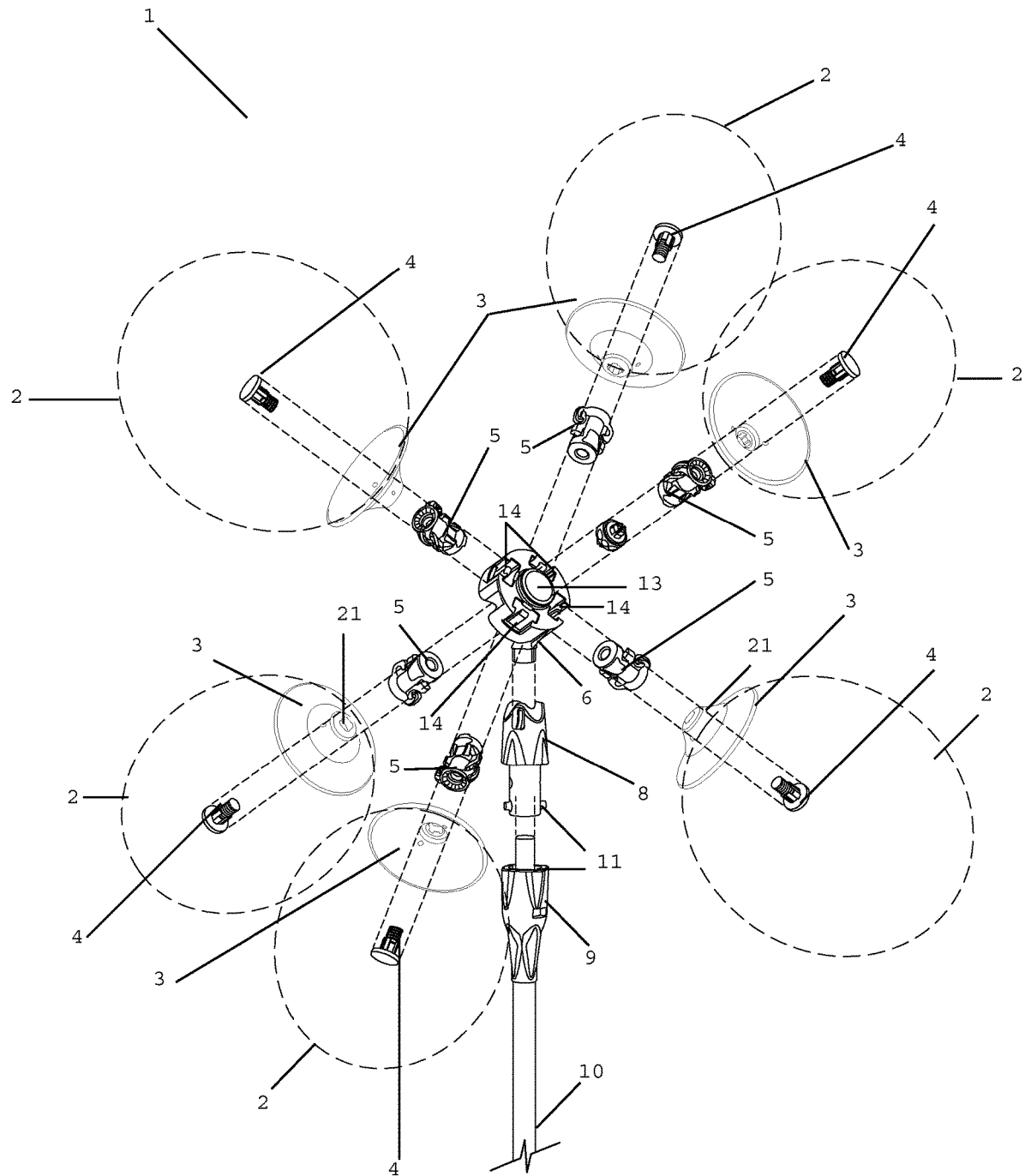
FIG. 1: is an exploded view of modular balloon cluster in one embodiment thereof.
Figure 2:
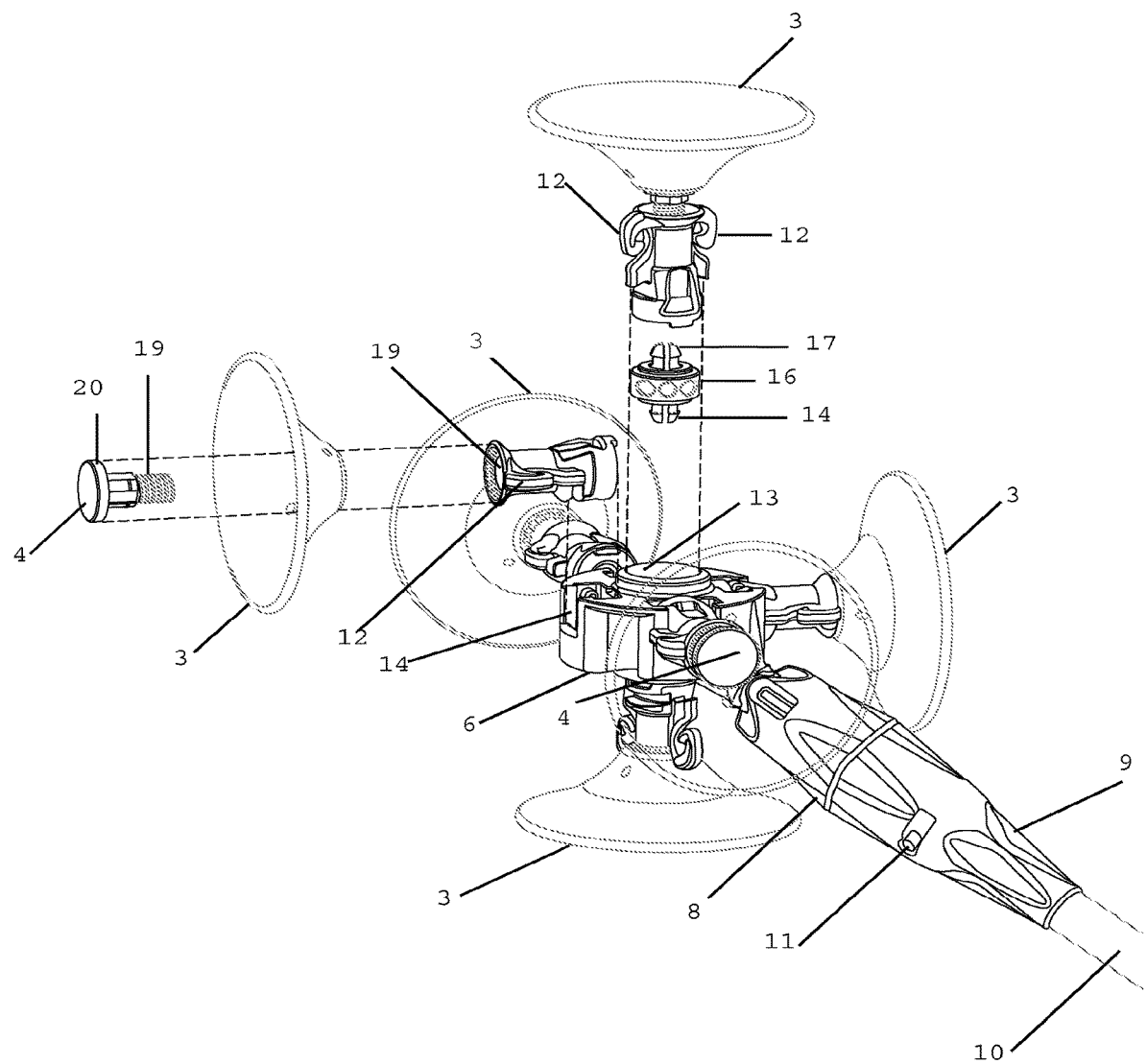
FIG. 2: is a partially assembled modular balloon cluster in one embodiment thereof.

Referring to FIGS. 1 and 2, in one embodiment, a modular balloon cluster (1) may include a plurality of balloons (2) or helium free balloons (2), the terms being generally interchangeable, coupled with a modular adaptor (6). In one preferred embodiment, a coupler (4) may be configured so as to be able to be coupled with, or secured with balloon support (3).

As shown in FIGS. 1 and 2, in this embodiment this coupler channel (9) may be an integral channel around an aperture in the balloon support (3) such that a coupler (4) may be inserted into and secured within a coupler channel (21) on a balloon support (3) which may form a fitted seal with, in this case a coupler head (20). Additional embodiments may include a variety of coupling mechanisms whereby a coupler (4) and balloon support (3) may be coordinated, such as through a threaded coupler channel, a twist lock coupler channel, a snap fit coupler channel and the like.

In this embodiment, such a balloon support (3) may provide support for the helium-free balloon to maintain its shape as well as helping to mimic the appearance of a "floating" helium-filled balloon. In this embodiment a balloon support (3) may be substantially circular and have a slightly concave configuration so as to conform to the circular shape of this exemplary balloon. Naturally, a variety of materials as well as shapes and configurations may be contemplated. For example, in certain embodiments, such a balloon support may include shaped, planar balloon supports to conform to non-circular helium-free balloons or other displays, as well as non-continuous supports and or frames. Certain embodiments may include a scalloped balloon support (3) as demonstrated in U.S. application Ser. No. 14/743,839, (incorporated herein by reference.) In certain embodiments the balloon support (3) may be integral with the helium-free balloon (2) or even attachable/detachable. As in a preferred embodiment this balloon support (3) may be formed of a clear plastic material, though other opaque plastic, and/or composite materials may be used.

Figure 7:
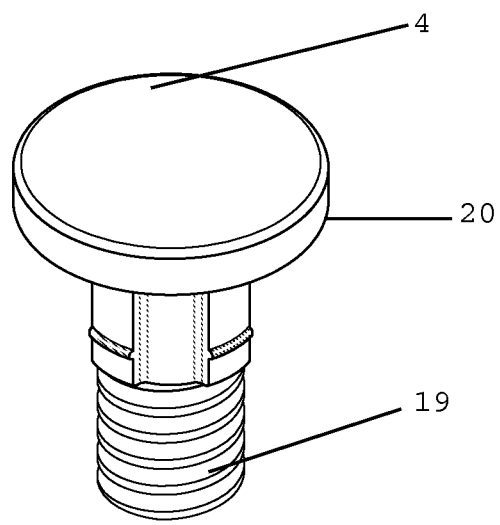
FIG. 7: is an isolated coupler with a threaded fastener position in one embodiment thereof.
Figure 8:
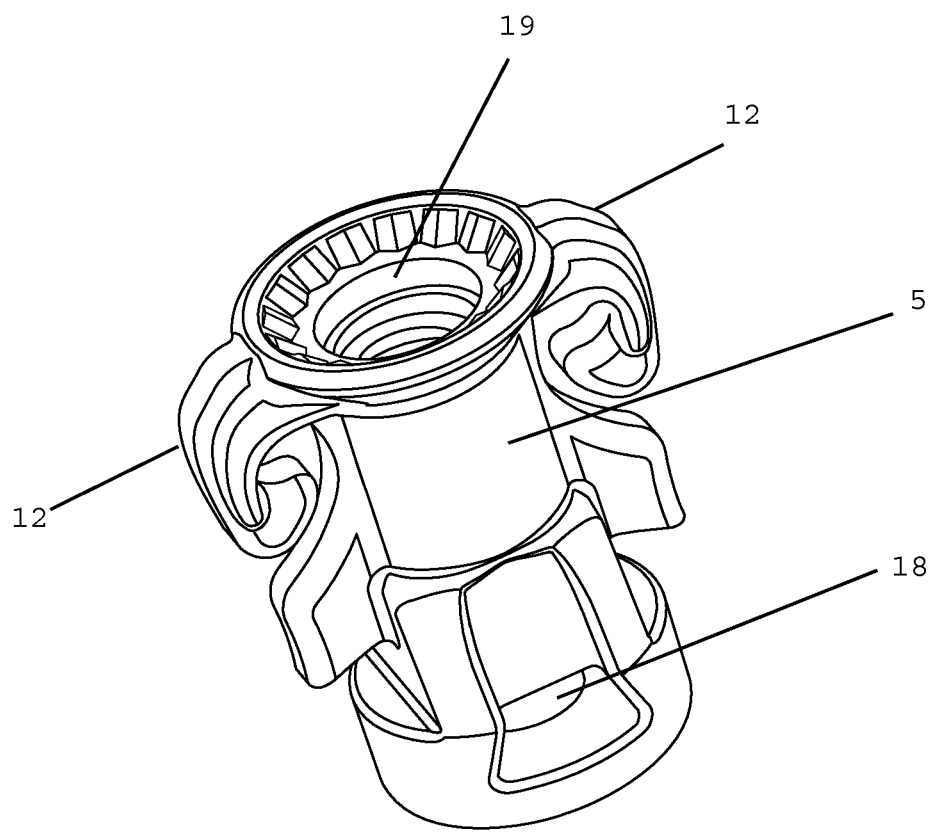
FIG. 8: is an modular connector with a threaded fastener position in one embodiment thereof.
Figure 9:
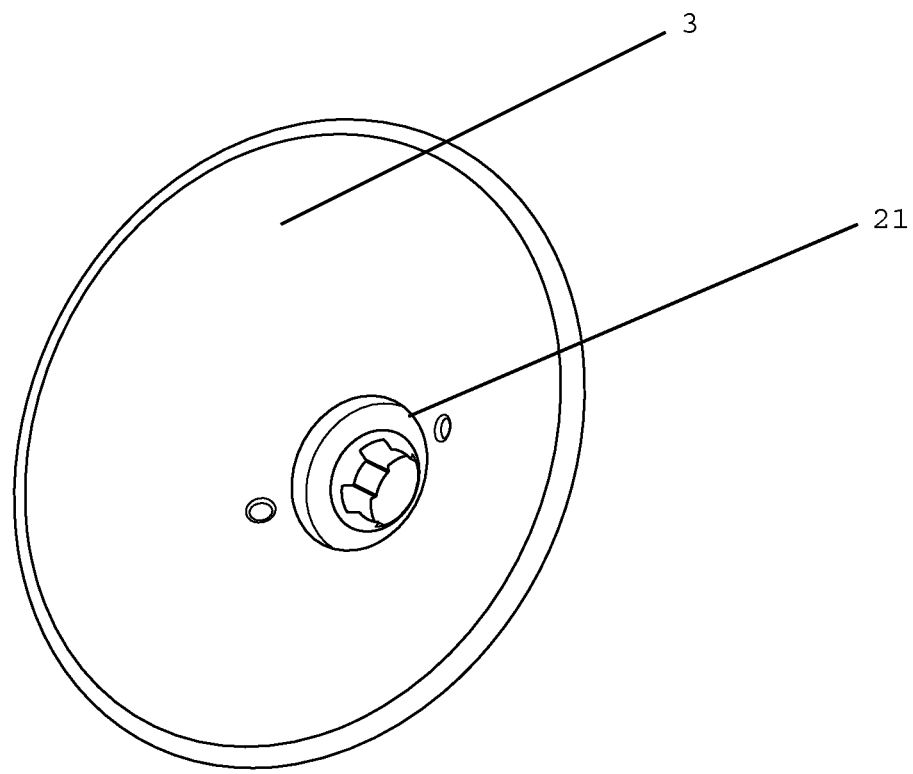
FIG. 9: is an isolated balloon support in one embodiment thereof.

Again, as shown in FIGS. 1 and 2, in certain embodiments a coupler (4) may further be secured to a modular adaptor (6). In a preferred embodiment, a coupler (4) may be secured with a modular connector (5) which may in turn be secured to a modular adaptor (6). In a preferred embodiment shown in the figures, a coupler (4) may include a fastener position (19) that might correspond to a fastener position (19) on a modular connector (5) or even a modular adaptor (6). As shown in FIGS. 7 and 8, this fastener position (19) may include a threaded fastener position (19), however additional embodiments may include a slide fastener, a twist fastener, a snap fastener, an adhesive fastener, a slot fastener, and a fitted fastener. In the preferred embodiment shown in FIGS. 1 and 2, a threaded fastener position (19) on said coupler may be secured with a corresponding threaded fastener position (19) on a modular connector (5) such that the two elements may be secured to one another. This securement may further act to secure the balloon support (3) with the modular connector (5).

Figure 4A:
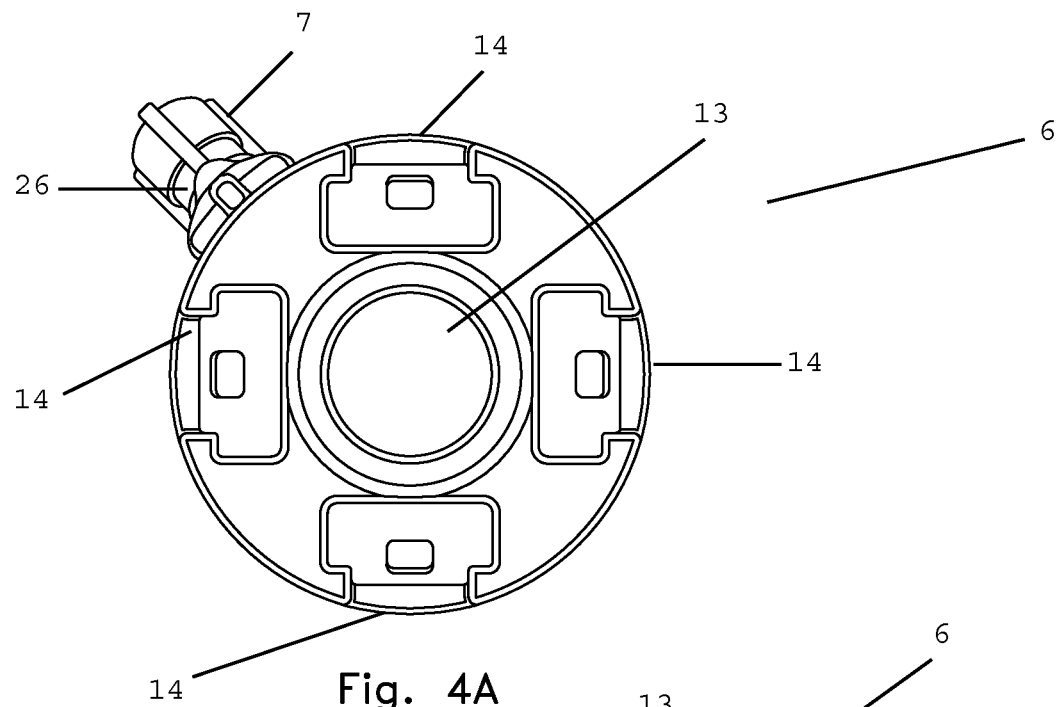
FIGS. 4A-B: is an isolated modular adaptor in one embodiment thereof.
Figure 4B:
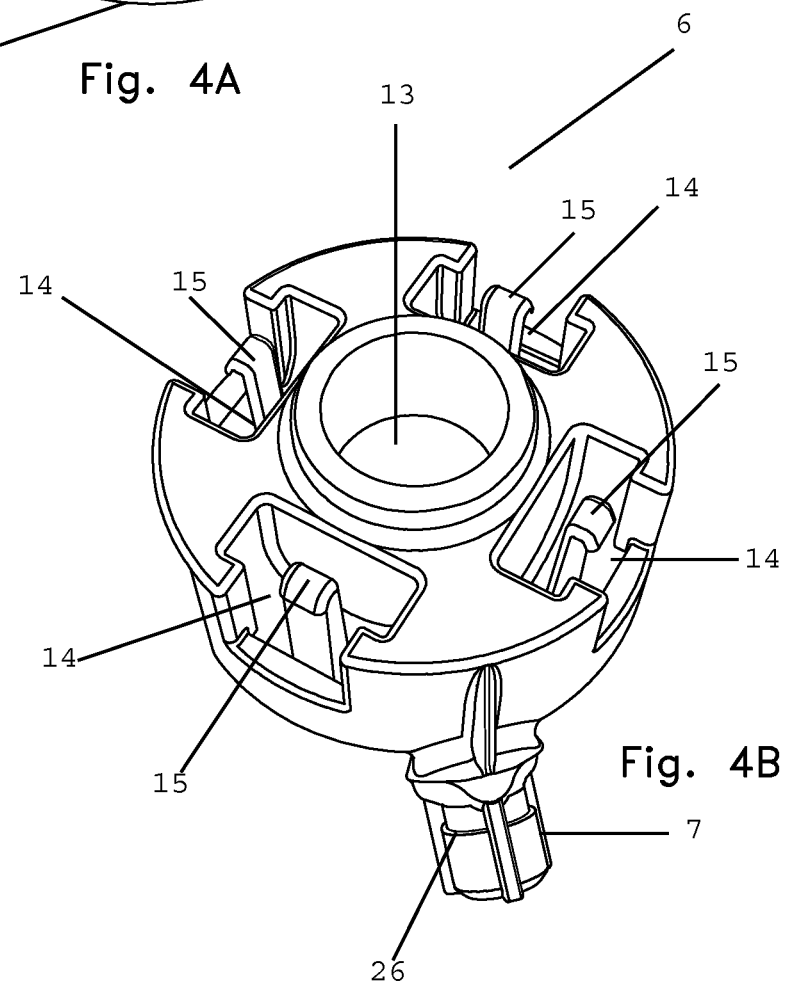

Again generally referring to FIGS. 1, 2 and 4, in one embodiment, a modular connector (5) may further be coupled with a modular adaptor (6). In one preferred embodiment, one or more modular connectors (5) may be coupled with a modular adaptor (6) through an adaptor slot (14). In the preferred embodiment shown in the figures, a modular adaptor (6) may include a plurality of adaptor slots (14) that may each secure at least one modular connector (5) or even a coupler (4), balloon support (3) or other component. In one embodiment, such adaptor slots (14) may be coupled with such components through a variety of securement mechanisms, including but not limited to a fitted coupling, a snap coupling, a twist coupling, a threaded coupling, a slide coupling an adhesive or even magnetic coupling and the like. In a preferred embodiment shown in FIG. 4, each adaptor slot (14) may include one or more adaptor catches (15). In this embodiment, a modular connector (5) may slide into a fitted adaptor slot (14). As the modular connector (5) is inserted into the adaptor slot (14), an adaptor catch (15) may be laterally pressed backward in a cam-like movement as it is inserted into an adaptor slide position (18). When the modular connector (5) is inserted into the adaptor slot (14) past a certain point, a hook or cam on the adaptor catch (15) may release and return to its original position securing the modular connector (5) in place. Naturally, additional locking and securement mechanisms may be employed to secure a modular connector (5), coupler (4) or other component with a modular adaptor (6). As such, an adaptor slot (14) may generally be construed to include any attachment point on the modular adaptor (6). Such mechanisms include a fitted coupling, a snap coupling, a twist coupling, a threaded coupling, a slide coupling an adhesive or even magnetic coupling and the like.

Figure 3:
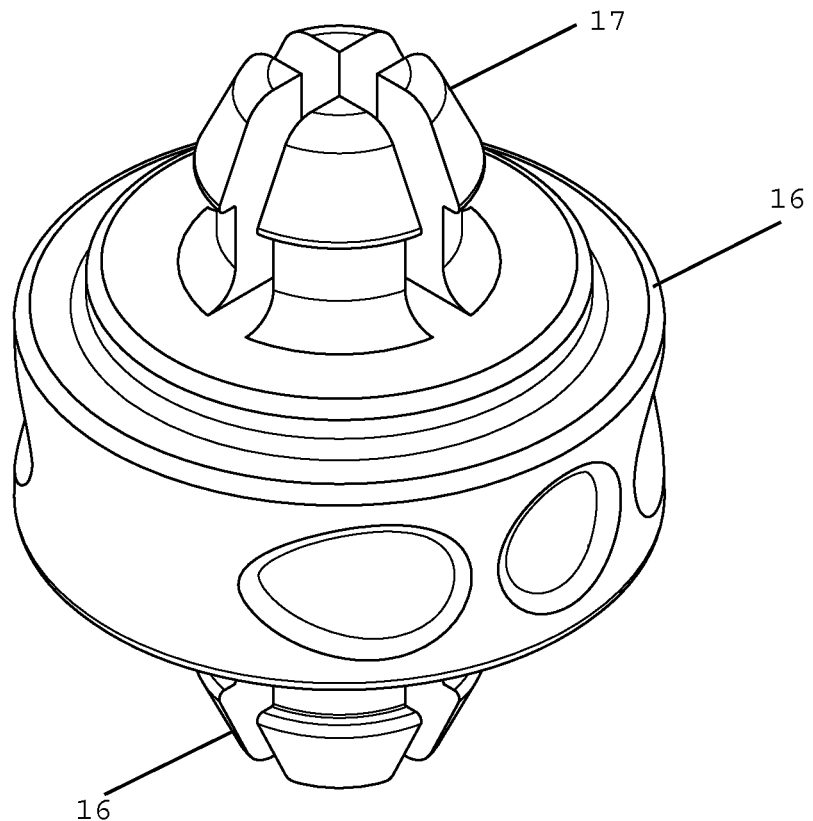
FIG. 3: is an isolated central adaptor in one embodiment thereof.

Now referring to FIGS. 1-3, in certain embodiments, a modular adaptor (6) may include a central aperture (13). In a preferred embodiment, a central adaptor (16) may be inserted and/or secured within the aperture. In some embodiments, such a central adaptor (16) may further be coupled with, for example a modular connector (5), a coupler (4), balloon support or even a balloon or even a rod (10) or a display pole (25) or a combination of such. Again, as shown in FIGS. 1-2, in a preferred embodiment, a central adaptor (16), having a fastener position may be inserted into a central aperture (13) and couple one or more modular connectors (5). In this configuration, one or more coupled helium-free balloons (2) may be positioned perpendicular, or at an angle from other helium-free balloons (2) that may be coupled to a modular adaptor (6) forming a three-dimensional spatial display cluster. In one embodiment shown in the figures, a central adaptor (16) may include one or more central adaptor connectors (17) that may be configured to secure, in this case a second fastener position on a modular connector (5). Naturally, as noted above, such a central adaptor connector (17) may include a variety of fastener mechanisms, such as a slide fastener, a fitted fastener, a snap fastener, a quick release fastener and the like.

In certain embodiments the inventive technology may include the ability to secure one or more helium-free balloons (2) to other components so as to secure its position in the modular balloon cluster (1). In one preferred embodiment, a helium-free balloon (2) may include one or more balloon handles (24). In this embodiment, such balloon handles (24) may be integral with the helium-free balloons' surface, or attachable/detachable so as to be transient. While such handles are typically formed of similar or even identical material as the helium-free balloon (2), in this preferred embodiment the handles may be sufficiently elastic in nature so as to be able to be secured with at least one balloon latch (12) on said modular connector (5)—though other components may include such a balloon latch (12).

In this embodiment, the balloon handles (13) may exert a downward force on the helium-free balloon (2) causing it to be more tightly secured to, in this instance a balloon support (3). In this embodiment, the action of the balloon handles (13) and balloon support (3) may help the balloon maintain its shape, for example in external environments. For example, wind force as well as temperature fluctuations, as well as natural air loss from the balloon may cause deformation of the balloons' shape and detract from the overall aesthetic appearance, as well as illusion of being a helium, or lighter-than-air balloon. Such handles also may provide the ability to quickly attach and detach helium-free balloons (2) making it easier to assemble or disassemble the modular elements of the cluster, or quickly change between different balloon colors or shapes.

In another preferred embodiment, a coupler (4) may be secured within a balloon aperture (not shown), such as can be accomplished through rotationally molding a helium-free balloon (2) with an integrated coupler (4) such as those described in U.S. patent application Ser. No. 14/201,665 (which is incorporated herein in its entirety). This integrated coupler (4) may include an fastener position (19), such as a threaded portion that may be coupled with, in this embodiment a modular connector (5), a balloon support (3), central adaptor (16) or even a modular adaptor (6). In an embodiment where this coupler (4) is a valve, the balloon may be inflated directly through the valve. In embodiments where this coupler does not have this valve function, the corresponding balloon may be inflated through an inflation support (not shown) and, for example an attached or separate plug (not shown). In this configuration, the helium-free balloon (2) may be positioned so as to be supported by, in this instance a circular concave balloon support (3) without any additional balloon handles (13) or other coupling devices. In still other embodiments, this couple may also act as a balloon support (3).

In still another embodiment, a helium-free modular balloon cluster (1) may include a coupler (4) or modular adaptor (6) having one or more integral or transient support extensions as described in U.S. patent application Ser. No. 14/743,839. In a preferred embodiment, such extension may be configured to be coupled with an internal fitting that may be secured in a helium-free balloon aperture such as can be accomplished through rotationally molding a helium-free balloon (2) with an internal fitting, again such as those described in U.S. patent application Ser. No. 14/201,665, (which is incorporated herein in its entirety.) In a preferred embodiment, an internal fitting may be manufactured from a plastic or composite material such as PVC or the like. Again, in a preferred embodiment, a support extension may be inserted into an internal fitting, forming a sealed fitted or pressure coupling. In additional embodiments, this coupling may include a threaded coupling, a slide lock coupling, a snap lock coupling, a flanged coupling.

Figure 11A:
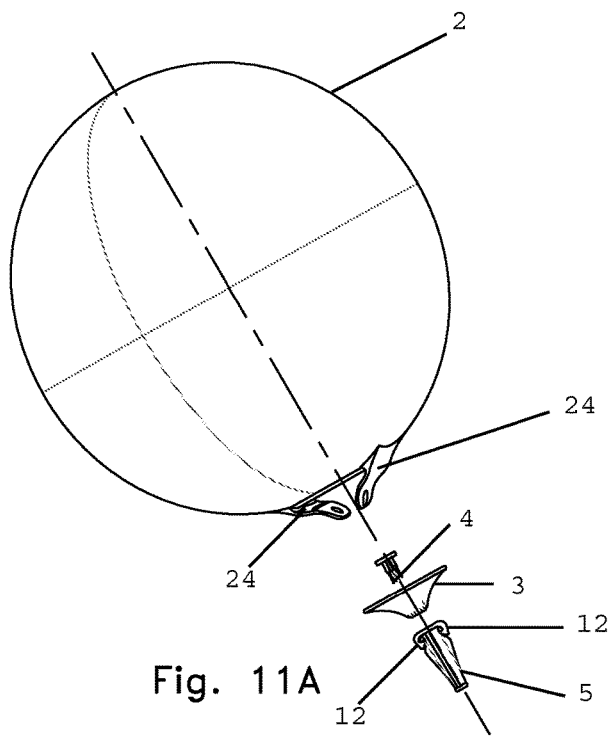
FIGS. 11A-C: is an alternative individual modular balloon cluster coupling having balloon handles secured to a modular connector in one embodiment thereof.
Figure 11B:
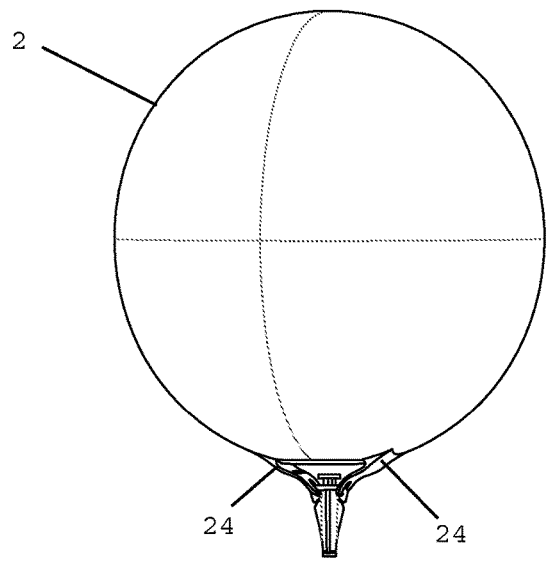
Figure 11C:
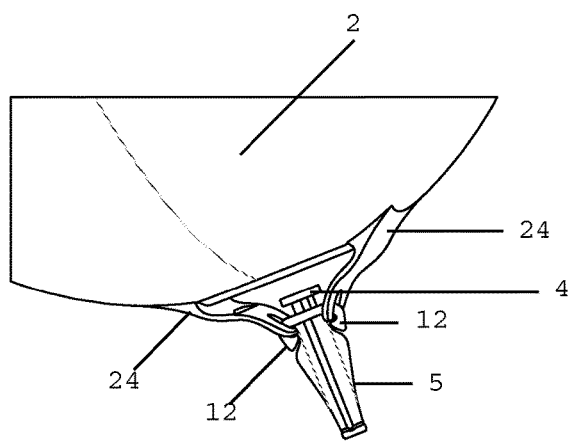

Again referring to FIG. 11, in one embodiment an inflation valve (19) may be incorporated into a coupler (4) or modular adaptor (6). In some embodiments this inflation valve (not shown) may be secured in the support extension, the coupler (4) or modular adaptor (6). In this configuration a helium-free balloon (2) may be inflated and deflated while secured to a coupler (4) or modular adaptor (6) or both without the need for an inflation port and/or separate plug enhancing the aesthetic appearance of the display and mimicking more effectively the appearance of a lighter than air balloon. In certain embodiments, this inflation valve may be integral with the coupler (4) or modular adaptor (6), or other component, or even secured through an overmold or other securement process, while in other embodiments it may be a separate modular component.

Figure 5:
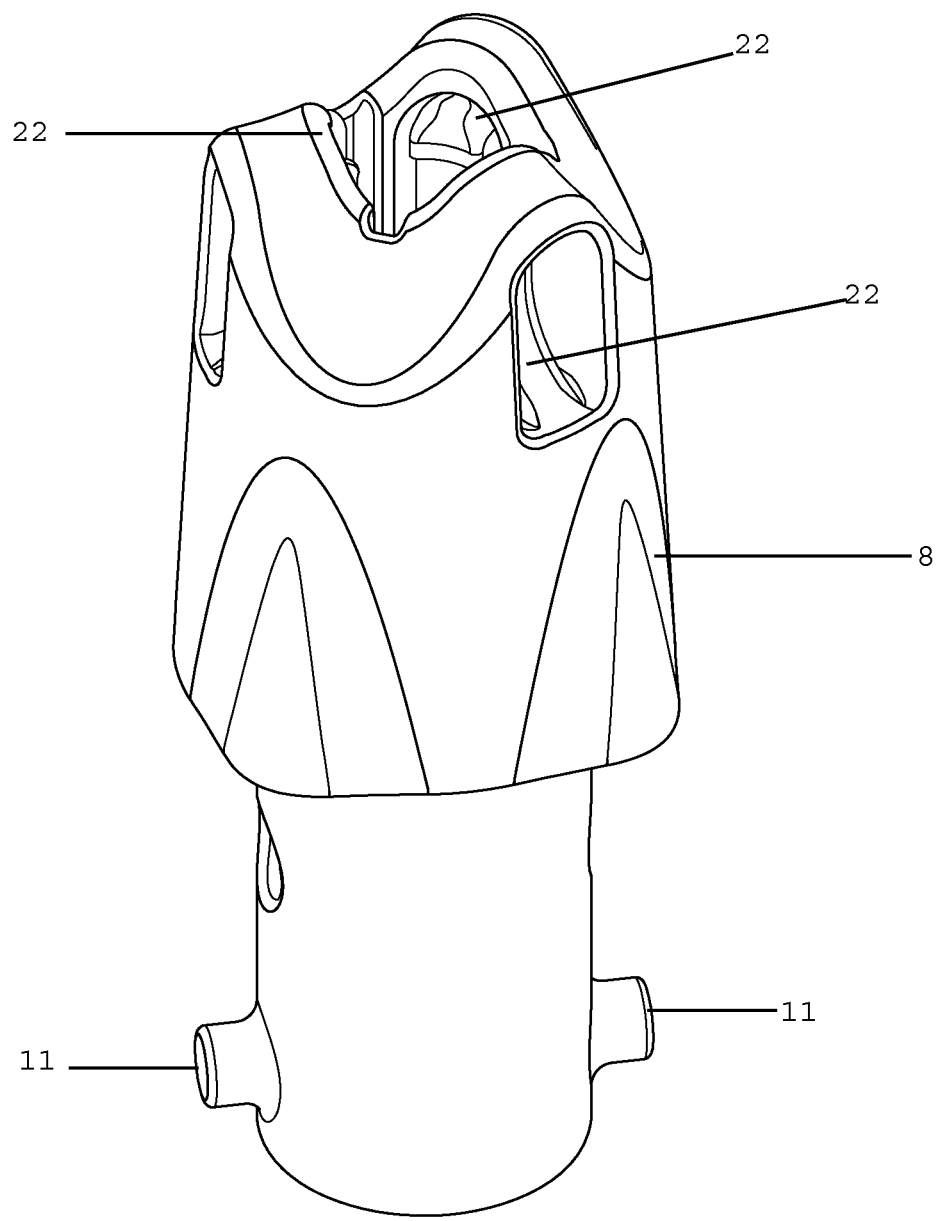
FIG. 5: is an isolated rod adaptor in one embodiment thereof.
Figure 6:
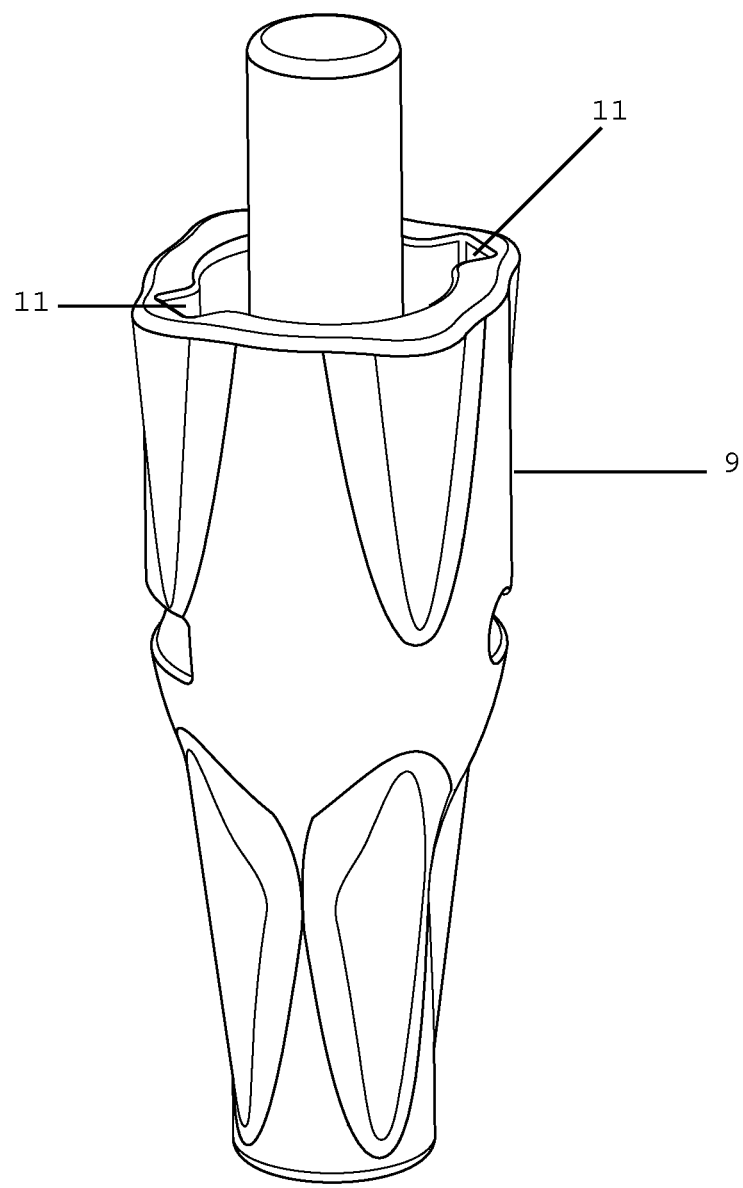
FIG. 6: is an isolated rod handle in one embodiment thereof.

Generally referring to FIGS. 1-2 and 5-6, in one embodiment one or more modular balloon clusters (1) may be coupled to supports to allow the balloon cluster to be elevated, or hang from a desired location. In one embodiment, a modular adaptor (6) may include a fastener position to secure one or more supports. In a preferred embodiment, a modular adaptor (6) may include an adaptor support (7). This adaptor support (7) may be attachable or detachable or integral with said modular adaptor (6), and may even be jointed so as to be adjustable. As shown in FIG. 1-2, in this embodiment an adaptor support (7) may be coupled with a support component, in this instance a rod adaptor (8). As shown in FIG. 5, in one embodiment a rod adaptor (8) may include one, or a plurality of fastener positions that may couple with the adaptor support (7). In a preferred embodiment a rod adaptor (8) may include one, or a plurality of rod adaptor latches (22). In this embodiment, a rod adaptor (8) may be inserted over the adaptor support (7) causing the adaptor latches (22) to move laterally in a cam action until a certain point when they are mechanically released and may hook into positions, such as a annular ridge on the adaptor support (7) forming a removable coupling. Again, as noted above, various coupling mechanisms may be contemplated including, for example latches on the adaptor support (7) and the like.

Referring now to FIGS. 1-2 as well as 5-6, in certain embodiments a rod adaptor (8) may be extended or extendable element, or it may be coupled with another support element such as a flexible rod or pole. In a preferred embodiment, a rod adaptor (8) may be coupled with a rod handle (9), through, for example a lock (11), which is shown in a preferred embodiment as a twist lock. In other embodiments a rod adaptor (8) may be secured with a rod (1), a rod handle (9) through a lock (11). Again, while such elements have initially been shown to be disparate or separate components, in certain embodiments such components may be integral so as to form a single component. For example, in one embodiment a rod handle (9) may be coupled with a rod (10), for example through a lock. In another embodiment, a rod handle (9) may be coupled with a rod (10), for example through a overmold. In this embodiment, two disparate elements may be brought together and a layer of material, such a composite or other plastic resin is overmolded over the elements coupling or joining them together. Typically, in a traditional overmolding process a component part or product, such as rod coupler (5) and rod (6), may be placed into a mold and a thermoplastic resin is injected into the void space between the component part and cores of the mold. By this general process a molten resin may be molded around the component part's outer surface coupling the components in this instance.

It should be noted that for purposes of the inventive technology, the term rod (10) may encompass a variety of support elements. For example, as noted above, in a referred embodiment a rod (6) may include a flexible fiberglass rod that may exhibit lateral movement mimicking the movement of a helium balloon in response to, for example a wind force. However, additional embodiments may include stationary rods or poles, support poles, jointed rods or poles, a support plate or extender (such as those described in U.S. patent application Ser. No. 14/742,855, which is incorporated herein by reference); and a ground stake; and even a support stand, such as a weighed support stand. In certain embodiments, a coupler (2), or even balloon support (3) may be coupled directly with any of these elements directly, or even indirectly.

Figures 10A, 10B:
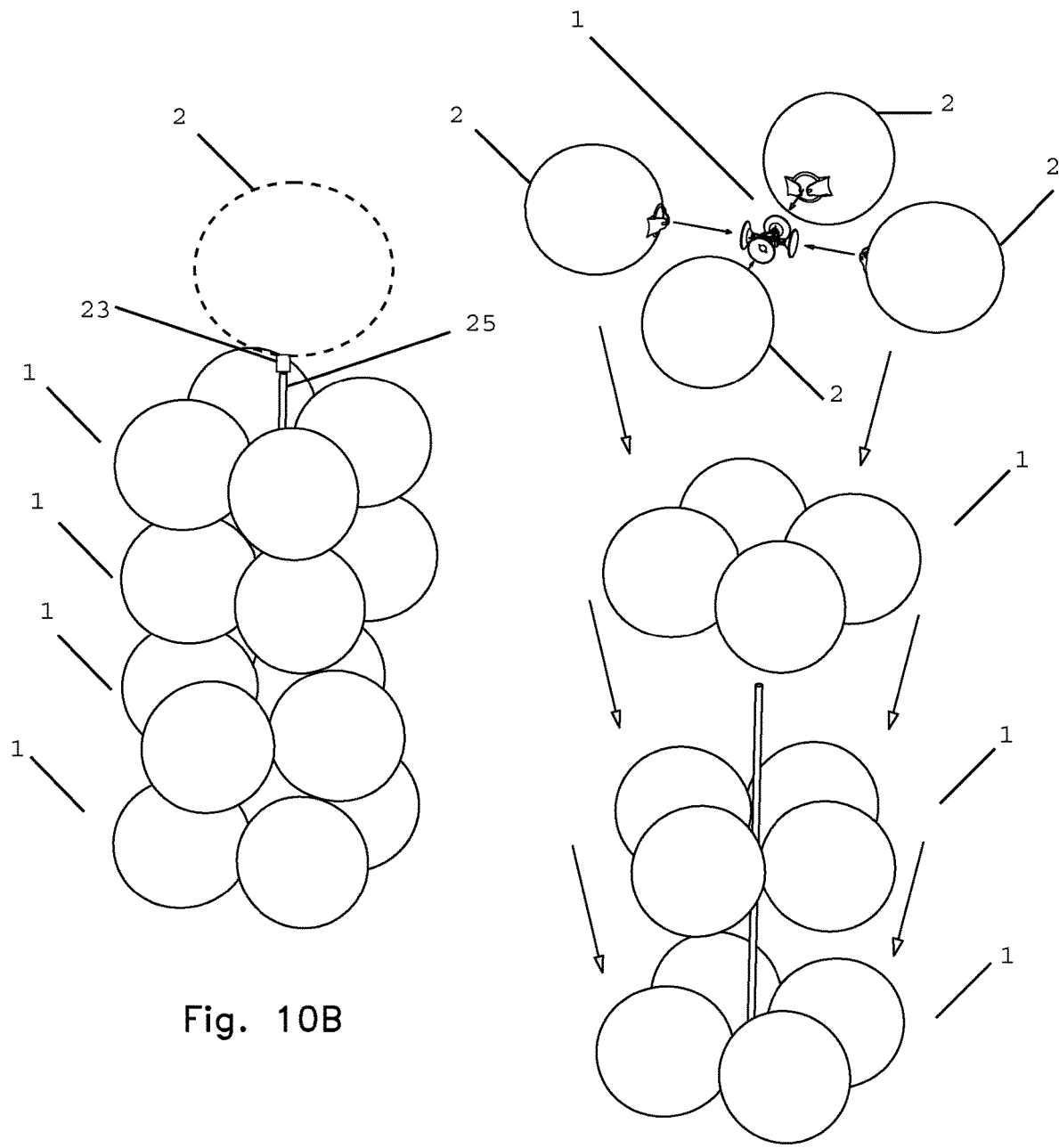
FIG. 10: is a plurality of modular balloon cluster coupled with a display pole in one embodiment thereof.

Referring now to FIG. 10, in one embodiment, a plurality of modular balloon clusters (1) may be grouped together to form a modular balloon cluster display. In one embodiment, a display pole (25), which may be shaped or as shown in the figures linear, may be inserted into a central aperture (13) on said modular adaptor (6). In a preferred embodiment, a plurality of helium-free balloons may be coupled with a modular adaptor (6) which may be inserted over a display pole (25), or a line support, such as a rope, string or wire. In this embodiment a plurality of modular balloon clusters (1) may be presented along the length of the display pole (25). In one preferred embodiment shown in FIG. 10B, individual modular balloon clusters (1) may be inserted over a display pole (25) in an offset manner producing a continuous spiral-like modular balloon cluster display. Further, in another embodiment, a helium-free balloon (2) may be coupled to a terminal end of a display pole (25). In some embodiments this may be accomplished by a modular connector (5) of couplers being coupled with a terminal modular adaptor (6) or central adaptor (16). In another embodiment, helium-free balloon (2) may be secured to a terminal end of a display pole (25) through a fastener position or end pole coupler (23) such as one described in U.S. Provisional Application No. 62/013,973.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the statements of invention. Indeed, as can be easily understood from the foregoing, the basic concepts of the present invention may be embodied in a variety of ways. It involves both modular balloon clustering techniques as well as modular balloon cluster devices to accomplish the appropriate system. In this application, the modular balloon clustering techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing the explicit embodiment(s) shown, the great variety of implicit alternative embodiments, and the broad methods or processes and the like are encompassed by this disclosure and may be relied upon when drafting any claims. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "coupler" should be understood to encompass disclosure of the act of "coupling"—whether explicitly discussed or not—and, conversely, were there effectively disclosure of the act of "coupling", such a disclosure should be understood to encompass disclosure of a "coupler" and even a "means for coupling." Such changes and alternative terms are to be understood to be explicitly included in the description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Patent Application or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s). References to be Incorporated by Reference in Accordance with the Patent Application:

US PATENTS

| Pat. No. | Kind Code | Date of Issuance | Patentee |
|---|---|---|---|
| 8,968,047 | B1 | 2015 Mar. 3 | Balloon Innovations LLC |
| 8,789,565 | B1 | 2014 Jul. 29 | Balloon Innovations LLC |
| D659200 | S | 2012 May 8 | Wicken |
| 1,527,046 | | 1922 Oct. 3 | Ingram |
| 2,143,691 | | 1938 Apr. 18 | Goldberg et al. |
| 3,892,081 | | 1975 Jul. 1 | Goral |
| 6,969,295 | B1 | 2005 Nov. 29 | Sidwell |
| D517123 | S | 2006 Mar. 14 | Sidwell |
| 7,588,477 | B2 | 2009 Sep. 15 | Sidwell |
| 7,611,395 | B2 | 2009 Nov. 3 | Bonsembiante |

NON PATENT LITERATURE DOCUMENTS

U.S. Patent Application No. 14/742,855, filed Jun. 18, 2015 titled "Self-Adjusting Support Plate"
U.S. Patent Application No. 14/840,612, filed Jun. 16, 2015 titled "Helium-Free Balloon Support Bracket"
U.S. Patent Application No. 14/635,898, filed May 30, 2015 titled "Balloon Support Apparatus"
U.S. Patent Application No. 14/201,665, filed Mar. 7, 2014 titled "Helium Free Balloon System"
U.S. Patent Application No. 61/774,344, filed Mar. 7, 2013 titled "Improved Methods and Apparatus for the Manufacture and Display of Helium-Free Balloons"
U.S. Patent Application No. 14/743,839, filed Jun. 18, 2015 titled "Helium-Free Balloon Assembly"
Amazon: Arizona Balloons; Jan. 24, 2013
Free Patents Online IP Research & Communities - Rotational Molding; Jan. 24, 2013
Giant Advertising Balloons; Jan. 24, 2013
Polyurethane Balloons - Balloon Country; Jan. 24, 2013
Professional Weather Balloons, 3, 8, and 16 Foot Diameters, Edmund Scientific; Jan. 24, 2013
Roto-Balloon Printing; Jan. 24, 2013
Weather Balloons - NovaLynx Corporation; Jan. 24, 2013
U.S. Design Application No. 29/4444,898, filed Feb. 5, 2013, titled "Balloon Cluster"

Thus, the applicant(s) should be understood to have support to claim and make a statement of invention to at least: i) each of the devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent* Group, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. It should be understood that this phrase also provides support for any combination of elements in the claims and even incorporates any desired proper antecedent basis for certain claim combinations such as with combinations of method, apparatus, process, and the like claims.

Furthermore, it should be noted that certain embodiments of the current invention may indicate a coupler, or the step of coupling. It should be noted that these may indicate a direct or in some cases an indirect connection and/or bring together of disparate or non-disparate elements in a functional, non-functional or desired configuration. Additionally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A modular balloon cluster comprising:
   at least one coupler configured to be coupled with a balloon support;
   at least one modular connector having at least one balloon latch configured to secure at least one balloon handle on at least one helium-free balloon and further configured to be secured with said coupler;
   at least one of said helium-free balloons configured to be supported by said balloon support and secured to said modular connector; and
   at least one modular adaptor configured to secure a plurality of said modular connectors in an opposing configuration and wherein said modular adaptor has a central aperture configured to be coupled with at least one of:
   a central adaptor further configured to be positioned within said central aperture on said modular adaptor and further configured to secure at least one of said modular connectors;
   at least one of said modular connectors;
   a display pole;
   a coupler;
   wherein the modular connector is coupled with said central adaptor through a central adaptor connector; and
   said modular connector further includes an adaptor slide position configured to receive an adaptor catch on the modular adaptor.

2. The modular balloon cluster as described in claim 1 wherein said coupler comprises a coupler having a coupler head configured to be secured with a coupler channel on said balloon support.

3. The modular balloon cluster as described in claim 1 wherein said coupler comprises a coupler having a fastener position configured to be secured with said modular connector.

4. The modular balloon cluster as described in claim 1 wherein said coupler comprises a coupler having a fastener position configured to be secured with said modular adaptor.

5. The modular balloon cluster as described in claim 1 wherein said coupler comprises a coupler selected from the group consisting of: a threaded coupler; a fitted coupler; a twist lock coupler; a snap lock coupler; a flexible coupler; and a quick release coupler.

6. The modular balloon cluster as described in claim 1 wherein said coupler comprises a valve.

7. The modular balloon cluster as described in claim 1 wherein said coupler comprises a coupler configured to be coupled with a coupler channel on said balloon support.

8. The modular balloon cluster as described in claim 1 wherein said balloon support comprises a balloon support selected from the group consisting of: a planar balloon support cup; a substantially circular balloon support cup; a scalloped balloon support cup; a rigid balloon support cup; and a flexible balloon support cup.

9. The modular balloon cluster as described in claim 1 wherein said modular connector comprises at least one fastener position configured to be coupled with said coupler.

10. The modular balloon cluster as described in claim 1 wherein said helium-free balloon comprises a helium-free balloon selected from the group consisting of: a seamed helium-free balloon; and a seamless helium-free balloon.

11. The modular balloon cluster as described in claim 1 wherein said a helium-free balloon has an integral balloon handle configured to be secured to said balloon latch.

12. The modular balloon cluster as described in claim 1 wherein said central aperture comprises a central aperture further configured to be coupled with said coupler.

13. The modular balloon cluster as described in claim 1 wherein said central aperture comprises a central aperture further configured to be coupled with said balloon support.

14. The modular balloon cluster as described in claim 1 and further comprising at least one central adaptor configured to be positioned within the central aperture on said modular adaptor and further configured to secure at least one display pole.

15. The modular balloon cluster as described in claim 1 and further comprising at least one central adaptor configured to be positioned within the central aperture on said modular adaptor and further configured to secure with said balloon support.

16. The modular balloon cluster as described in claim 1 and further comprising at least one central adaptor configured to be positioned within the central aperture on said modular adaptor and further configured to secure with a rod.

17. The modular balloon cluster as described in claim 1 and further comprising at least one central adaptor configured to be positioned within the central aperture on said modular adaptor and further configured to secure with a rod adaptor.

18. The modular balloon cluster as described in claim 1 wherein said central adaptor comprises at least one central adaptor connector configured to be coupled with the modular connector.

19. The modular balloon cluster as described in claim 1 wherein said central adaptor comprises at least one central adaptor connector configured to be coupled with the coupler.

20. The modular balloon cluster as described in claim 1 wherein said modular adaptor comprises an adaptor slot wherein said adaptor slot is configured to secure a modular connector.

21. The modular balloon cluster as described in claim 1 wherein said modular adaptor comprises a modular adaptor having a plurality of adaptor slots wherein said adaptor slots are configured to secure a plurality of modular connectors.

22. The modular balloon cluster as described in claim 1 wherein said modular adaptor includes an adaptor catch configured to couple with an adaptor slide position on said modular connector.

23. The modular balloon cluster as described in claim 1 and further comprising an adaptor support.

24. The modular balloon cluster as described in claim 23 wherein said adaptor support comprises an adjustable adaptor support.

25. The modular balloon cluster as described in claim 23 wherein said adaptor support comprises an integral adaptor support.

26. The modular balloon cluster as described in claim 23 wherein said adaptor support comprises an adaptor support configured to be secured with a rod adaptor.

27. The modular balloon cluster as described in claim 23 wherein said adaptor support comprises an adaptor support configured to be secured with a rod.

28. The modular balloon cluster as described in claim 23 wherein said adaptor support comprises an adaptor support configured to be secured with a display pole.

29. The modular balloon cluster as described in claim 23 wherein said adaptor support comprises an adaptor support configured to be secured with a rod handle.

30. The modular balloon cluster as described in claim 23 wherein said adaptor support comprises an adaptor support configured to be secured with a support line.

31. The modular balloon cluster as described in claim 23 and further comprising a rod adaptor configured to be coupled with said modular adaptor.

32. The modular balloon cluster as described in claim 31 wherein said rod adaptor configured to be coupled with said modular adaptor comprises a rod adaptor configured to be secured with an adaptor support through one or more rod adaptor latches.

33. The modular balloon cluster as described in claim 1 and further comprising a rod handle configured to be coupled with a rod adaptor.

34. The modular balloon cluster as described in claim 33 wherein said rod handle configured to be coupled with said rod adaptor comprises a rod handle configured to be coupled with said rod adaptor with a lock.

35. The modular balloon cluster as described in claim 1 and further comprising a rod handle configured to be coupled with said modular adaptor.

36. The modular balloon cluster as described in claim 35 and further comprising a rod handle configured to be coupled with said modular adaptor through an adaptor support.

37. The modular balloon cluster as described in claim 33 wherein said rod handle comprises a rod handle configured to be coupled with a rod.

38. The modular balloon cluster as described in claim 37 wherein said rod handle configured to be coupled with a rod comprises a rod handle configured to be coupled with a rod through an overmold.

39. The modular balloon cluster as described in claim 1 and further comprising at least one end pole coupler.

40. The modular balloon cluster as described in claim 1 wherein said modular adaptor comprises a modular adaptor configured to be secured to a display pole.

41. The modular balloon cluster as described in claim 1 wherein said modular adaptor comprises a modular adaptor configured to be secured to a support line.

42. The modular balloon cluster as described in claim 40 wherein said modular adaptor configured to be secured to a display pole comprises a plurality of modular adaptor adaptors configured to be secured to the display pole.

43. The modular balloon cluster as described in claim 42 wherein said plurality of modular adaptors configured to be secured to the display pole comprises a plurality of modular adaptors configured to be secured to the display pole in an offset configuration.

44. A spatial modular balloon cluster comprising:
at least one coupler configured to be coupled with a balloon support;

at least one modular connector having at least one balloon latch configured to secure at least one balloon handle on at least one helium-free balloon and further configured to be secured with said coupler;

at least one of said helium-free balloons configured to be supported by said balloon support and secured to said modular connector;

at least one modular adaptor having a plurality of adaptor slots wherein said adaptor slots are configured to secure at least one modular connector; and at least one central adaptor configured to be positioned within a central aperture on said modular adaptor and further configured to secure at least one of said modular connectors.

45. The modular balloon cluster as described in claim 44 wherein said coupler comprises a coupler having a fastener position configured to be secured with said modular adaptor.

46. The modular balloon cluster as described in claim 44 wherein said coupler comprises a coupler selected from the group consisting of: a threaded coupler; a fitted coupler; a twist lock coupler; a snap lock coupler; a flexible coupler; and a quick release coupler.

47. The modular balloon cluster as described in claim 44 wherein said coupler comprises a valve.

48. The modular balloon cluster as described in claim 44 wherein said coupler comprises a coupler configured to be coupled with a coupler channel on said balloon support.

49. The modular balloon cluster as described in claim 44 wherein said balloon support comprises a balloon support selected from the group consisting of: a planar balloon support cup; a substantially circular balloon support cup; a scalloped balloon support cup; a rigid balloon support cup; and a flexible balloon support cup.

50. The modular balloon cluster as described in claim 44 wherein said modular connector comprises at least one fastener position configured to be coupled with said coupler.

51. The modular balloon cluster as described in claim 44 wherein said modular connector comprises a modular connector having at least one adaptor slide position configured to secure at least one modular connector with said modular adaptor.

52. The modular balloon cluster as described in claim 51 wherein said adaptor slide position comprises a modular connector adaptor slide position configured to receive an adaptor catch on the modular adaptor.

53. The modular balloon cluster as described in claim 44 wherein said helium-free balloon comprises a helium-free balloon selected from the group consisting of: a seamed helium-free balloon; and a seamless helium-free balloon.

54. The modular balloon cluster as described in claim 44 and further comprising a helium-free balloon having an integral balloon handle configured to be secured to a balloon latch on said modular connector.

55. The modular balloon cluster as described in claim 44 wherein said balloon handle is an integral balloon coupler.

56. The modular balloon cluster as described in claim 44 wherein said helium-free balloon has an integral balloon handle configured to be secured to said modular adaptor.

57. The modular balloon cluster as described in claim 44 wherein said helium-free balloon has an integral balloon handle configured to be secured to said balloon support.

58. The modular balloon cluster as described in claim 44 wherein said central aperture comprises a central aperture configured to be coupled with said coupler.

59. The modular balloon cluster as described in claim 44 wherein said central aperture comprises a central aperture configured to be coupled with said balloon support.

60. The modular balloon cluster as described in claim 44 wherein said central adaptor comprises a central adaptor configured to be positioned within a central aperture on said modular adaptor and further configured to be secured with at least one display pole.

61. The modular balloon cluster as described in claim 44 wherein said central adaptor comprises a central adaptor configured to be positioned within a central aperture on said modular adaptor and further configured to be secured with said coupler.

62. The modular balloon cluster as described in claim 44 and further comprising at least one central adaptor configured to be positioned within a central aperture on said modular adaptor and further configured to be secured with said balloon support.

63. The modular balloon cluster as described in claim 44 and further comprising at least one central adaptor configured to be positioned within a central aperture on said modular adaptor and further configured to be secured with a rod.

64. The modular balloon cluster as described in claim 44 and further comprising at least one central adaptor configured to be positioned within a central aperture on said modular adaptor and further configured to be secured with a rod adaptor.

65. The modular balloon cluster as described in claim 61 wherein said central adaptor comprises at least one central adaptor connector.

66. The modular balloon cluster as described in claim 61 wherein said central adaptor comprises at least one central adaptor connector configured to be coupled with the modular connector.

67. The modular balloon cluster as described in claim 44 wherein said central adaptor comprises at least one central adaptor connector configured to be coupled with the coupler.

68. The modular balloon cluster as described in claim 44 wherein said modular adaptor includes an adaptor catch configured to couple with an adaptor slide position on said modular connector.

69. The modular balloon cluster as described in claim 44 and further comprising an adaptor support.

70. The modular balloon cluster as described in claim 69 wherein said adaptor support comprises an adjustable adaptor support.

71. The modular balloon cluster as described in claim 69 wherein said adaptor support comprises an integral adaptor support.

72. The modular balloon cluster as described in claim 69 wherein said adaptor support comprises an adaptor support configured to be secured with a rod adaptor.

73. The modular balloon cluster as described in claim 44 wherein said adaptor support comprises an adaptor support configured to be secured with a rod.

74. The modular balloon cluster as described in claim 44 wherein said adaptor support comprises an adaptor support configured to be secured with a display pole.

75. The modular balloon cluster as described in claim 44 wherein said adaptor support comprises an adaptor support configured to be secured with a rod handle.

76. The modular balloon cluster as described in claim 44 wherein said adaptor support comprises an adaptor support configured to be secured with a support line.

77. The modular balloon cluster as described in claim 44 and further comprising a rod adaptor configured to be coupled with said modular adaptor.

78. The modular balloon cluster as described in claim 77 wherein said rod adaptor configured to be coupled with said modular adaptor comprises a rod adaptor configured to be secured with an adaptor support through one or more rod adaptor latches.

79. The modular balloon cluster as described in claim 44 and further comprising a rod handle configured to be coupled with a rod adaptor.

80. The modular balloon cluster as described in claim 79 wherein said rod handle configured to be coupled with said rod adaptor comprises a rod handle configured to be coupled with said rod adaptor with a lock.

81. The modular balloon cluster as described in claim 44 and further comprising a rod handle configured to be coupled with said modular adaptor.

82. The modular balloon cluster as described in claim 81 and further comprising a rod handle configured to be coupled with said modular adaptor through an adaptor support.

83. The modular balloon cluster as described in claim 79 wherein said rod handle comprises a rod handle configured to be coupled with a rod.

84. The modular balloon cluster as described in claim 83 wherein said rod handle configured to be coupled with a rod comprises a rod handle configured to be coupled with a rod through an overmold.

85. The modular balloon cluster as described in claim 44 and further comprising at least one end pole coupler.

86. The modular balloon cluster as described in claim 44 wherein said modular adaptor comprises a modular adaptor configured to be secured to a display pole.

87. The modular balloon cluster as described in claim 44 wherein said modular adaptor comprises a modular adaptor configured to be secured to a support line.

88. The modular balloon cluster as described in claim 86 wherein said modular adaptor configured to be secured to a display pole comprises a plurality of modular adaptors configured to be secured to the display pole.

89. The modular balloon cluster as described in claim 88 wherein said plurality of modular adaptors configured to be secured to the display pole comprises a plurality of modular adaptors configured to be secured to a display pole in an offset configuration.

90. A modular balloon cluster display comprising:
at least one coupler configured to be coupled with a balloon support;
at least one modular connector having at least one balloon latch configured to secure at least one balloon handle on at least one helium-free balloon and further configured to be secured with said coupler;
at least one of said helium-free balloons configured to be supported by said balloon support and secured to said modular connector;
at least one modular adaptor configured to secure a plurality of said modular connectors, wherein said modular adaptor includes at least one adaptor slot having at least one adaptor catch, and wherein said modular adaptor has a central aperture configured to be coupled with at least one of:
a central adaptor further configured to secure at least one of said modular connectors;
at least one of said modular connectors; and
a display pole;
at least one adaptor support wherein said adaptor support further comprises an adjustable adaptor support or integral adaptor support.

91. The modular balloon cluster as described in claim 90 wherein said coupler comprises a coupler having a coupler head configured to be secured with a coupler channel on said balloon support.

92. The modular balloon cluster as described in claim 90 wherein said coupler comprises a coupler having a fastener position configured to be secured with said modular connector.

93. The modular balloon cluster as described in claim 90 wherein said coupler comprises a coupler having a fastener position configured to be secured with said modular adaptor.

94. The modular balloon cluster as described in claim 90 wherein said coupler comprises a coupler selected from the group consisting of: a threaded coupler; a fitted coupler; a twist lock coupler; a snap lock coupler; a flexible coupler; and a quick release coupler.

95. The modular balloon cluster as described in claim 90 wherein said coupler comprises a valve.

96. The modular balloon cluster as described in claim 90 wherein said coupler comprises a coupler configured to be coupled with a coupler channel on said balloon support.

97. The modular balloon cluster as described in claim 90 wherein said balloon support comprises a balloon support selected from the group consisting of: a planar balloon support cup; a substantially circular balloon support cup; a scalloped balloon support cup; a rigid balloon support cup; and a flexible balloon support cup.

98. The modular balloon cluster as described in claim 90 wherein said modular connector comprises at least one fastener position configured to be coupled with said coupler.

99. The modular balloon cluster as described in claim 90 wherein said modular connector comprises at least one balloon latch configured to secure a balloon.

100. The modular balloon cluster as described in claim 90 wherein said helium-free balloon comprises a helium-free balloon selected from the group consisting of: a seamed helium-free balloon; and a seamless helium-free balloon.

101. The modular balloon cluster as described in claim 90 wherein said helium-free balloon has an integral balloon handle configured to be secured to a balloon latch on said modular connector.

102. The modular balloon cluster as described in claim 1 wherein said central aperture comprises a central aperture further configured to be coupled with said coupler.

103. The modular balloon cluster as described in claim 1 wherein said central aperture comprises a central aperture further configured to be coupled with said balloon support.

104. The modular balloon cluster as described in claim 90 and further comprising at least one central adaptor configured to be positioned within a central aperture on said modular adaptor and further configured to secure at least one of said modular connectors.

105. The modular balloon cluster as described in claim 90 and further comprising at least one central adaptor configured to be positioned within a central aperture on said modular adaptor and further configured to secure at least one display pole.

106. The modular balloon cluster as described in claim 90 and further comprising at least one central adaptor configured to be positioned within a central aperture on said modular adaptor and further configured to secure with said coupler.

107. The modular balloon cluster as described in claim 90 and further comprising at least one central adaptor configured to be positioned within a central aperture on said modular adaptor and further configured to secure with said balloon support.

108. The modular balloon cluster as described in claim 90 and further comprising at least one central adaptor configured to be positioned within a central aperture on said modular adaptor and further configured to secure with a rod.

109. The modular balloon cluster as described in claim 90 and further comprising at least one central adaptor configured to be positioned within a central aperture on said modular adaptor and further configured to secure with a rod adaptor.

110. The modular balloon cluster as described in claim 104 wherein said central adaptor comprises at least one central adaptor connector.

111. The modular balloon cluster as described in claim 104 wherein said central adaptor comprises at least one central adaptor connector configured to be coupled with the modular connector.

112. The modular balloon cluster as described in claim 104 wherein said central adaptor comprises at least one central adaptor connector configured to be coupled with the coupler.

113. The modular balloon cluster as described in claim 90 wherein said modular adaptor comprises an adaptor slot wherein said adaptor slot is configured to secure a modular connector.

114. The modular balloon cluster as described in claim 90 wherein said modular adaptor comprises a modular adaptor having a plurality of adaptor slots wherein said adaptor slots are configured to secure a plurality of modular connectors.

115. The modular balloon cluster as described in claim 90 wherein said adaptor catch configured to couple with an adaptor slide position on said modular connector.

116. The modular balloon cluster as described in claim 90 wherein said adaptor support comprises an adaptor support configured to be secured with a rod adaptor.

117. The modular balloon cluster as described in claim 90 wherein said adaptor support comprises an adaptor support configured to be secured with a rod.

118. The modular balloon cluster as described in claim 90 wherein said adaptor support comprises an adaptor support configured to be secured with the display pole.

119. The modular balloon cluster as described in claim 90 wherein said adaptor support comprises an adaptor support configured to be secured with a rod handle.

120. The modular balloon cluster as described in claim 90 wherein said adaptor support comprises an adaptor support configured to be secured with a support line.

121. The modular balloon cluster as described in claim 90 and further comprising a rod adaptor configured to be coupled with said modular adaptor.

122. The modular balloon cluster as described in claim 121 wherein said rod adaptor configured to be coupled with said modular adaptor comprises a rod adaptor configured to be secured with said adaptor support through one more one or more rod adaptor latches.

123. The modular balloon cluster as described in claim 90 and further comprising a rod handle configured to be coupled with a rod adaptor.

124. The modular balloon cluster as described in claim 123 wherein said rod handle configured to be coupled with said rod adaptor comprises a rod handle configured to be coupled with said rod adaptor with a lock.

125. The modular balloon cluster as described in claim 90 and further comprising a rod handle configured to be coupled with said modular adaptor.

126. The modular balloon cluster as described in claim 125 and further comprising a rod handle configured to be coupled with said modular adaptor through an adaptor support.

127. The modular balloon cluster as described in claim 123 wherein said rod handle comprises a rod handle configured to be coupled with a rod.

128. The modular balloon cluster as described in claim 127 wherein said couple rod comprises a rod handle configured to be coupled with a rod through an overmold.

129. The modular balloon cluster as described in claim 90 and further comprising at least one end pole coupler.

130. The modular balloon cluster as described in claim 90 wherein said modular adaptor comprises a modular adaptor configured to be secured to a support line.

131. The modular balloon cluster as described in claim 90 wherein said modular adaptor configured to be secured to a display pole comprises a plurality of modular adaptors configured to be secured to the display pole.

132. The modular balloon cluster as described in claim 131 wherein said plurality of modular adaptors configured to be secured to a display pole comprises a plurality of modular adaptors configured to be secured to the display pole in an offset configuration.

133. An integrated modular balloon cluster comprising:
at least one coupler configured to be coupled with a balloon support;
at least one modular connector configured to be secured with said coupler;
at least one helium-free balloon configured to be supported by said balloon support and secured to a balloon latch on said modular connector through at least one balloon handle;
at least one modular adaptor having a plurality of adaptor slots wherein said adaptor slots are configured to secure a modular connector;
at least one central adaptor configured to be positioned within a central aperture on said modular adaptor and further configured to secure a plurality of said modular connectors;
at least one adaptor support configured to be coupled with at least one rod adaptor; and
at least one rod handle configured to be coupled with at least one rod.

134. An adaptable modular balloon cluster comprising:
a coupler secured by a helium-free balloon;
a balloon support configured to be coupled with said coupler;
at least one modular adaptor configured to secure a plurality of modular connectors configured in opposing positions and wherein said modular adaptor has a central aperture configured to be coupled with a central adaptor configured to be positioned within said central aperture on said modular adaptor and further configured to secure at least one modular connector; and
at least one helium-free balloon configured to be supported by said balloon support and wherein said helium-free balloon has at least one balloon handle configured to be secured to a balloon latch on a modular connector.

* * * * *